United States Patent
Brick et al.

(10) Patent No.: US 11,062,165 B2
(45) Date of Patent: Jul. 13, 2021

(54) CORNER DETECTION

(71) Applicant: Movidius Limited, Schiphol-Rijk (NL)

(72) Inventors: Cormac Brick, Dublin (IE); Brendan Barry, Dublin (IE); Fergal Connor, Dundalk (IE); David Moloney, Dublin (IE)

(73) Assignee: Movidius Limited, Schiphol-Rijk (NL)

( * ) Notice: Subject to any disclaimer, the term of this patent is extended or adjusted under 35 U.S.C. 154(b) by 97 days.

(21) Appl. No.: 15/835,926

(22) Filed: Dec. 8, 2017

(65) Prior Publication Data

US 2018/0101746 A1   Apr. 12, 2018

Related U.S. Application Data

(63) Continuation of application No. 14/283,603, filed on May 21, 2014, now Pat. No. 9,842,271.

(30) Foreign Application Priority Data

May 23, 2013 (GB) ..................................... 1309287

(51) Int. Cl.
*G06K 9/46* (2006.01)
*G06K 9/00* (2006.01)

(52) U.S. Cl.
CPC ....... *G06K 9/4604* (2013.01); *G06K 9/00986* (2013.01)

(58) Field of Classification Search
CPC .......................... G06K 9/4604; G06K 9/00986
See application file for complete search history.

(56) References Cited

U.S. PATENT DOCUMENTS

| | | | |
|---|---|---|---|
| 4,281,312 A | 7/1981 | Knudson |
| 4,680,730 A | 7/1987 | Omoda et al. |
| 4,783,841 A | 11/1988 | Crayson |
| 5,081,573 A | 1/1992 | Hall et al. |
| 5,226,171 A | 7/1993 | Hall et al. |
| 5,262,973 A | 11/1993 | Richardson |
| 5,434,623 A | 7/1995 | Coleman et al. |

(Continued)

FOREIGN PATENT DOCUMENTS

| CA | 1236584 | 5/1988 |
|---|---|---|
| CN | 1078841 | 11/1993 |

(Continued)

OTHER PUBLICATIONS

• Trajković, Miroslav, and Mark Hedley. "Fast corner detection." Image and vision computing 16.2 (1998): 75-87. (Year: 1998).*

(Continued)

*Primary Examiner* — Pinalben Patel
(74) *Attorney, Agent, or Firm* — Hanley, Flight & Zimmerman, LLC (57) ABSTRACT

The present application provides a method of corner detection and an image processing system for detecting corners in an image. The preferred implementation is in software using enabling and reusable hardware features in the underlying vector processor architecture. The advantage of this combined software and programmable processor datapath hardware is that the same hardware used for the FAST algorithm can also be readily applied to a variety of other computational tasks, not limited to image processing.

20 Claims, 10 Drawing Sheets

(56) References Cited

U.S. PATENT DOCUMENTS

| | | | |
|---|---|---|---|
| 5,621,863 A | 4/1997 | Boulet et al. | |
| 5,861,873 A | 1/1999 | Kikinis | |
| 5,968,167 A | 10/1999 | Whittaker et al. | |
| 6,173,389 B1 | 1/2001 | Pechanek et al. | |
| 6,275,921 B1 | 8/2001 | Iwata et al. | |
| 6,304,605 B1 | 10/2001 | Haikonen et al. | |
| 6,366,999 B1 | 4/2002 | Drabenstott et al. | |
| 6,467,036 B1 | 10/2002 | Pechanek et al. | |
| 6,539,115 B2 | 3/2003 | Fujimoto et al. | |
| 6,577,316 B2 | 6/2003 | Brethour et al. | |
| 6,591,019 B1 | 7/2003 | Comair et al. | |
| 6,760,831 B2 | 7/2004 | Drabenstott et al. | |
| 6,839,728 B2 | 1/2005 | Pitsianis et al. | |
| 6,851,041 B2 | 2/2005 | Pechanek et al. | |
| 6,859,870 B1 | 2/2005 | Kim et al. | |
| 6,948,087 B2 | 9/2005 | Brethour et al. | |
| 6,954,842 B2 | 10/2005 | Drabenstott et al. | |
| 7,010,668 B2 | 3/2006 | Drabenstott et al. | |
| 7,038,687 B2 | 5/2006 | Booth, Jr. et al. | |
| 7,124,279 B2 | 10/2006 | Topham | |
| 7,146,487 B2 | 12/2006 | Drabenstott et al. | |
| 7,343,471 B2 | 3/2008 | Topham | |
| 7,366,874 B2 | 4/2008 | Seong et al. | |
| 7,409,530 B2 | 8/2008 | Kim et al. | |
| 7,424,594 B2 | 9/2008 | Pitsianis et al. | |
| 7,958,070 B2 | 6/2011 | Mitarai et al. | |
| 8,081,816 B1 | 12/2011 | Irick et al. | |
| 8,253,802 B1 * | 8/2012 | Anderson | G06T 7/149 348/169 |
| 8,713,080 B2 | 4/2014 | Maloney | |
| 8,861,864 B2 | 10/2014 | Hong et al. | |
| 9,082,016 B2 | 7/2015 | Yoon et al. | |
| 9,317,770 B2 | 4/2016 | Ding et al. | |
| 9,842,271 B2 * | 12/2017 | Brick | G06K 9/4604 |
| 2003/0005261 A1 | 1/2003 | Sheaffer | |
| 2003/0053261 A1 | 3/2003 | Thia et al. | |
| 2003/0149822 A1 | 8/2003 | Scott et al. | |
| 2003/0154358 A1 | 8/2003 | Seong et al. | |
| 2004/0101045 A1 | 5/2004 | Yu et al. | |
| 2004/0260410 A1 | 12/2004 | Sakamoto | |
| 2006/0023429 A1 | 2/2006 | Ribeiro et al. | |
| 2007/0291571 A1 | 12/2007 | Balasundaram | |
| 2008/0016016 A1 * | 1/2008 | Mitarai | G06K 9/00288 706/25 |
| 2008/0068389 A1 | 3/2008 | Bakalash et al. | |
| 2012/0045135 A1 * | 2/2012 | Yanase | G06K 9/38 382/201 |
| 2012/0275712 A1 * | 11/2012 | Inaba | G06K 9/6211 382/201 |
| 2013/0089261 A1 | 4/2013 | Sung | |
| 2013/0322761 A1 | 12/2013 | Leng et al. | |
| 2014/0207836 A1 | 7/2014 | Mundarath et al. | |
| 2014/0301650 A1 * | 10/2014 | Irie | G06K 9/00281 382/201 |
| 2014/0348431 A1 | 11/2014 | Brick et al. | |
| 2015/0089189 A1 | 3/2015 | Gonion | |

FOREIGN PATENT DOCUMENTS

| | | |
|---|---|---|
| CN | 1326132 | 12/2001 |
| CN | 101086680 | 12/2007 |
| CN | 103514594 | 1/2014 |
| CN | 106023171 | 10/2016 |
| DE | 69228442 | 9/1999 |
| DE | 69519801 | 6/2001 |
| DE | 69709078 | 10/2002 |
| DE | 102007025948 | 1/2008 |
| EP | 0240032 | 10/1987 |
| EP | 0245027 | 11/1987 |
| EP | 1158401 | 11/2001 |
| EP | 1241892 | 9/2002 |
| ES | 2171919 | 9/2002 |
| FI | 97096 | 6/1996 |
| FR | 2835934 | 8/2003 |
| GB | 710876 | 6/1954 |
| GB | 1488538 | 10/1977 |
| GB | 2311882 | 10/1997 |
| GB | 2362055 | 11/2001 |
| GB | 2362733 | 11/2001 |
| GB | 2366643 | 3/2012 |
| JP | 03042969 | 5/2000 |
| JP | 2002007211 | 1/2002 |
| JP | 6062825 | 1/2017 |
| WO | 9313628 | 7/1993 |
| WO | 9608928 | 3/1996 |
| WO | 9738372 | 10/1997 |
| WO | 0022503 | 4/2000 |
| WO | 0034887 | 6/2000 |
| WO | 0045282 | 8/2000 |
| WO | 0143074 | 6/2001 |
| WO | 0184849 | 11/2001 |
| WO | 200251099 | 6/2002 |
| WO | 2005091109 | 9/2005 |
| WO | 2008010634 | 1/2008 |
| WO | 2008087195 | 7/2008 |
| WO | 2013055448 | 4/2013 |
| WO | 2016053762 | 4/2016 |

OTHER PUBLICATIONS

United States Patent and Trademark Office, "Non-Final office action", issued in connection with U.S. Appl. No. 14/283,603, dated May 17, 2016, 55 pages.

United States Patent and Trademark Office, "Notice of Allowance", issued in connection with U.S. Appl. No. 14/283,603, dated Aug. 4, 2017, 67 pages.

U.K Intellectual Property Office, "Combined Search and Examination Report", issued in connection with U.K patent application No. GB1713570.8, dated Sep. 29, 2017, 6 pages.

U.K Intellectual Property Office, "Notification of Grant", issued in connection with U.K patent application No. GB1309287.9, dated Sep. 12, 2017, 2 pages.

U.K Intellectual Property Office, "Intention to Grant", issued in connection with U.K patent application No. GB1309287.9, dated Jul. 31, 2017, 2 pages.

"ARM Architecture Reference Manual", ARMv7-A and ARMv7-R edition, 2734 pages (1996-1998, 200, 2004-2012). (uploaded in 4 parts).

"Cortex-A8" Revision r3p2, Tecnical Reference Manual, 580 pages (206-2010).

"Cortex-A9, Neon Media Processing Engine", Revision r3p0, Technical Reference Manual , 49 pages. (2008-2011).

"i.M.X. 6 Dual/6quad Applications Processor Reference Manual", Rev.2, 5817 pages (uploaded in 4 parts) (Jun. 2014).

"MSC8256 Reference Manual", Six Core Digital Signal Processor, Rev. 0, 1272 pages. (Jul. 2011).

"SC140 DSP Core Reference Manua", Rev. 3, 712 pages. (Nov. 2001).

Rosten et al., "Machine learning for high-speed corner detection", Department of Engineering, Cambridge University U.K, 14 pages.

Williamson,"ARM Cortex A8: A High Perfomance Processor for Low Power Applications", 23 pages, In Unique chips and systems (Eugene John, Juan Rubio, eds) Boca Raton Press (2008).

U.K Intellectual Property Office, "Intention to Grant", issued in connection with U.K patent application No. 1713570 GB dated Nov. 20, 2017, 2 pages.

Biadgie et al., "Feature Detector Using Adaptive Accelerated Segment Test," IEEE, (2014), 4 pages.

Dohi et al., "Pattern Compression of Fast Corner Detection for Efficient Hardware Implementation," International Conference on Field and Programmable Logic and Applications, (2011), 4 pages.

Tayara et al., "A Real-Time Marker-Based Visual Sensor Based on a FPGA and a Soft Core Processor," MDPI, (2016), 21 pages.

Teixeira et al., "Accelerated Corner Detector Algorithms," PUC-Rio, (2008), 10 pages.

\* cited by examiner

PRIOR ART

| VLIW ASSEMBLER | | REGISTERS | | | | | | | | | | | | | | | | | NOTE |
|---|---|---|---|---|---|---|---|---|---|---|---|---|---|---|---|---|---|---|---|
| | v2 | PC+T | PC+T | PC+T | PC+T | PC+T | PC+T | PC+T | PC+T | PC+T | PC+T | PC+T | PC+T | PC+T | PC+T | PC+T | PC+T | | |
| VAU.SUB.u8s v2, v1, v2 | v1 | P15 | P14 | P13 | P12 | P11 | P10 | P9 | P8 | P7 | P6 | P5 | P4 | P3 | P2 | P1 | P0 | | Saturating Subtract 8-bit pixels from centre pixel + threshold |
| | v2 | = | = | = | = | = | = | = | = | = | = | = | = | = | = | = | = | | |
| | v3 | PC-T | PC-T | PC-T | PC-T | PC-T | PC-T | PC-T | PC-T | PC-T | PC-T | PC-T | PC-T | PC-T | PC-T | PC-T | PC-T | | |
| VAU.SUB.u8s v3, v1 | v1 | P15 | P14 | P13 | P12 | P11 | P10 | P9 | P8 | P7 | P6 | P5 | P4 | P3 | P2 | P1 | P0 | | Saturating Subtract 8-bit pixels from centre pixel - threshold |
| | v3 | = | = | = | = | = | = | = | = | = | = | = | = | = | = | = | = | | |
| CMU.VNZ.x8 I12, v2, 0x0 | v2 | | | | | | | | | | | | | | | | | | Create 16-bit vector (1 for each pixel) of non-zeros for the upper threshold tests |
| | I12 | b15 | b14 | b13 | b12 | b11 | b10 | b9 | b8 | b7 | b6 | b5 | b4 | b3 | b2 | b1 | b0 | | |
| CMU.VNZ.x8 I13, v3, 0x0 | v3 | | | | | | | | | | | | | | | | | | Create vector of non-zeros for the lower threshold tests |
| | I13 | b15 | b14 | b13 | b12 | b11 | b10 | b9 | b8 | b7 | b6 | b5 | b4 | b3 | b2 | b1 | b0 | | |

CORNER DETECTION

CROSS-REFERENCE TO RELATED APPLICATIONS

This patent arises from a continuation of U.S. patent application Ser. No. 14/283,603 (now U.S. Pat. No. 9,842, 271), filed on May 21, 2014, U.S. patent application Ser. No. 14/283,603 and this patent claim priority under 35 U.S.C. § 119 to British patent application GB1309287.9, filed on May 23, 2013, the contents of which are expressly incorporated by reference herein in their entireties for all purposes.

FIELD OF THE APPLICATION

This present application relates generally to image processing and more particularly to a method of detecting features in an image.

BACKGROUND

Feature detection is an important process used in image processing, for example in computer vision. One particular type of feature detection is that of corner detection, which may be used to determine the outline of an object in a scene captured by an imaging device such as a camera.

The FAST (Features from Accelerated Segment Test) algorithm, described for example in E. Rosten, T. Drummond, "Machine learning for high-speed corner detection", European Conference on Computer Vision, 2006, pp. 430-443, is a known feature/corner detection algorithm used in computer vision as it is efficient to run on some processor-architectures. Depending on the particular processor architecture, it can be many times faster than other existing corner detectors. It also offers high levels of repeatability with large aspect changes and for different kinds of feature.

Figure 1:
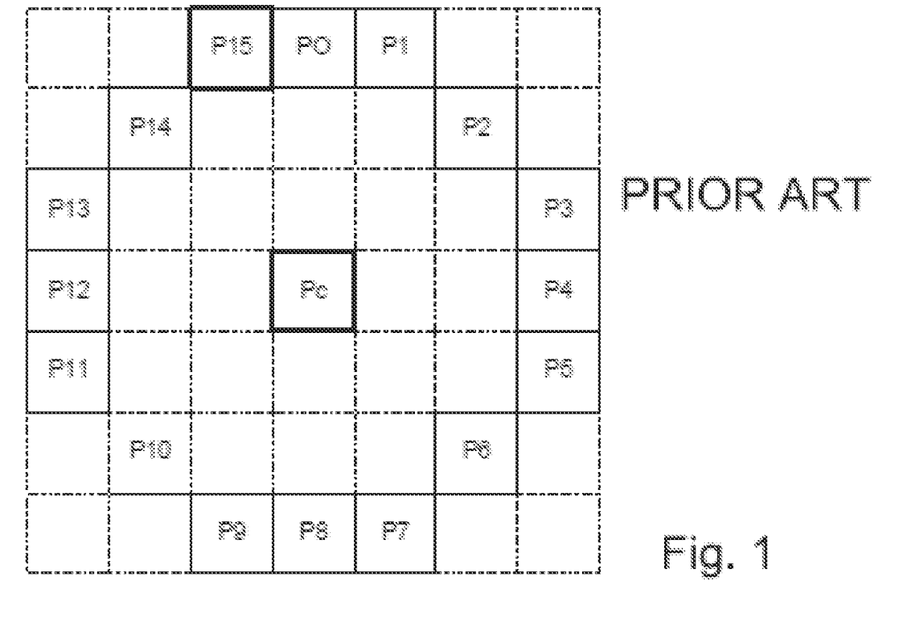
FIG. 1 is an exemplary pattern of pixels as employed by prior art corner detection methods.

The FAST algorithm (FAST9 variant) will now be explained with reference to FIG. 1, in which a region of pixels from an image is shown. The FAST algorithm operates on the basis of a Bresenham circle of pixels Pi (where $15>=i>=0$) about a centre pixel Pc Based on this Bresenham circle of pixels, the FAST algorithm applies a criterion to determine a corner. This criteria is that a candidate corner is a corner if there are N contiguous pixels such that Pi>Pc+T or Pi<Pc−T for each pixel Pi in the contiguous arc, where T is threshold, suitably predefined. N may be 9, 10, 11 or 12. Any of the patterns in the figure below would produce a correct output from the FAST detector. Similar patterns exist for other FAST variants such as FAST7, FAST12 etc.

The method may employ Non-Maximal suppression as an additional test to confirm a corner. In this additional test, each corner is given a score based on the absolute sum of the differences between each pixel Pi in the arc and the centre pixel. This score may be used to suppress non-maximum corners in a close knit group.

Whilst the FAST algorithm is useful, it has its limitations. For example, whilst it may be employed readily within Scalar/RISC processor architectures, implementation on SIMD/VLIW processor architectures is relatively poor as the number of cycles/pixel can be high due to the overhead of branch delay slots due to the high number of pixel comparisons as detection requirements increase.

In addition to software implementations of the FAST algorithm a relevant hardware implementation is presented in Vilariño, D. L., Brea, V. M., "Feature detection and matching on an SIMD/MIMD hybrid embedded processor", Computer Vision and Pattern Recognition Workshops (CVPRW), 2012 IEEE Computer Society Conference on Date of Conference: 16-21 Jun. 2012, pp. 21-26 which has a performance of 88CC/Pixel per processing element on proposed efficient architecture (128 PEs on FPGA). While interesting this architecture is dedicated to FAST and the hardware coprocessor is not programmable and neither is the hardware usable for other applications.

The present application addresses this and other problems.

SUMMARY

The present application provides a method of corner detection and an image processing system for detecting corners in an image. The preferred implementation is in software using enabling and reusable hardware features in the underlying vector processor architecture. The advantage of this combined software and programmable processor datapath hardware is that the same hardware used for the FAST algorithm can also be readily applied to a variety of other computational tasks, not limited to image processing.

DESCRIPTION OF DRAWINGS

The present application will now be described with reference to the drawings in which.

DETAILED DESCRIPTION

The improved corner detection process described herein uses a fixed cost parallel corner detector which computes all possible combinations in parallel which is particularly suited to vector processors and vector processing. Although the process is described with reference to an exemplary method comprising a series of steps of 16-bit vector processing, it will be appreciated that other bit vectors, for example 32 or 64 bits, may be employed.

In a first step, each of the pixels in the contiguous pattern (Pi) is provided as an element in a vector $V_{\_pi}$. Thus for example, the pattern of pixels arranged in the Bresenham circle of FIG. 1, i.e. P0-P15, may be employed. Although the examples use a Bresenham circle of radius 3, the method is easily extensible to Bresenham circles of different radii and other pixel configurations.

In a second step, two vectors are generated using the vector $V_{-Pi}$. Each element in these vectors represents the result of a comparison between the candidate pixel Pc and entries in $V_{-pi}$, i.e. the pixels surrounding the candidate in a contiguous pattern.

The vectors represent two individual comparisons between each Pi with the candidate pixel Pc. The first comparison is whether the individual pixel value exceeds that of the candidate pixel by a threshold value.

The second comparison is whether the individual pixel is less than that of the candidate pixel by a threshold value. It will be appreciated by those skilled in the art that this threshold value is predetermined or preset as per the prior art FAST method discussed in the background. Thus the step results in a first vector V_pcu as follows:

$$V\_pcu=\text{clamp}(V\_pi-(V\_pc-T), 0, 255)$$

in which the elements are nonzero only if Pi>Pc+T, where T is the threshold. Similarly, the step results in a second vector V_pcl as follows:

$$V\_pcl=\text{clamp}(V\_pi-(V\_pc-T), 0, 255)$$

in which the elements are zero only if Pi<Pc−T.

The third step reduces these two vector values to be a scalar value, i.e. the vector is reduced to a 16 bit representation that indicates which of the entries in each of the two vectors are non-zero, with S_ru being the scalar representation of V_pcu and S_rl being the scalar representation of V_pcl.

The fourth step counts/adds the individual bits within each of the scalar values, i.e. in each 16 bit value how many of the bits are 1. If the count in both scalar value individually is less than N (where N is the number of contiguous pixels required out of the contiguous pattern as a whole to be considered a corner, suitably N is 9 or more.), the candidate pixel is discounted, since when there are less than N pixels, it is impossible for there to be N contiguous bits. It will be appreciated that this fourth step is like the improved first stage—a screening method to eliminate pixel candidates that are not corners rather than making a determination as such. It will be appreciated that only one of the scalar values S_rl and S_ru can pass the test. If neither passes, the pixel candidate is not a corner; otherwise, the scalar value that passes is used in the subsequent step, and for convenience is designated as S_r generally.

The fifth step creates a vector V_r by repeating the element S_multiple times. Alternatively stated a vector V_r is created where the individual entries in the vector are each S_r.

The next step is computationally very efficient. The step is based on the premise that for a given pattern of X contiguous bits, there are only a limited number of combinations of N contiguous bits within the arrangement. By having a vector with each of these combinations stored, it is possible to do a straightforward AND vector operation with the vector V_to see if there is match. If the result is non zero, then the Vector V_r has more than N contiguous bits and is a corner.

Figure 6:
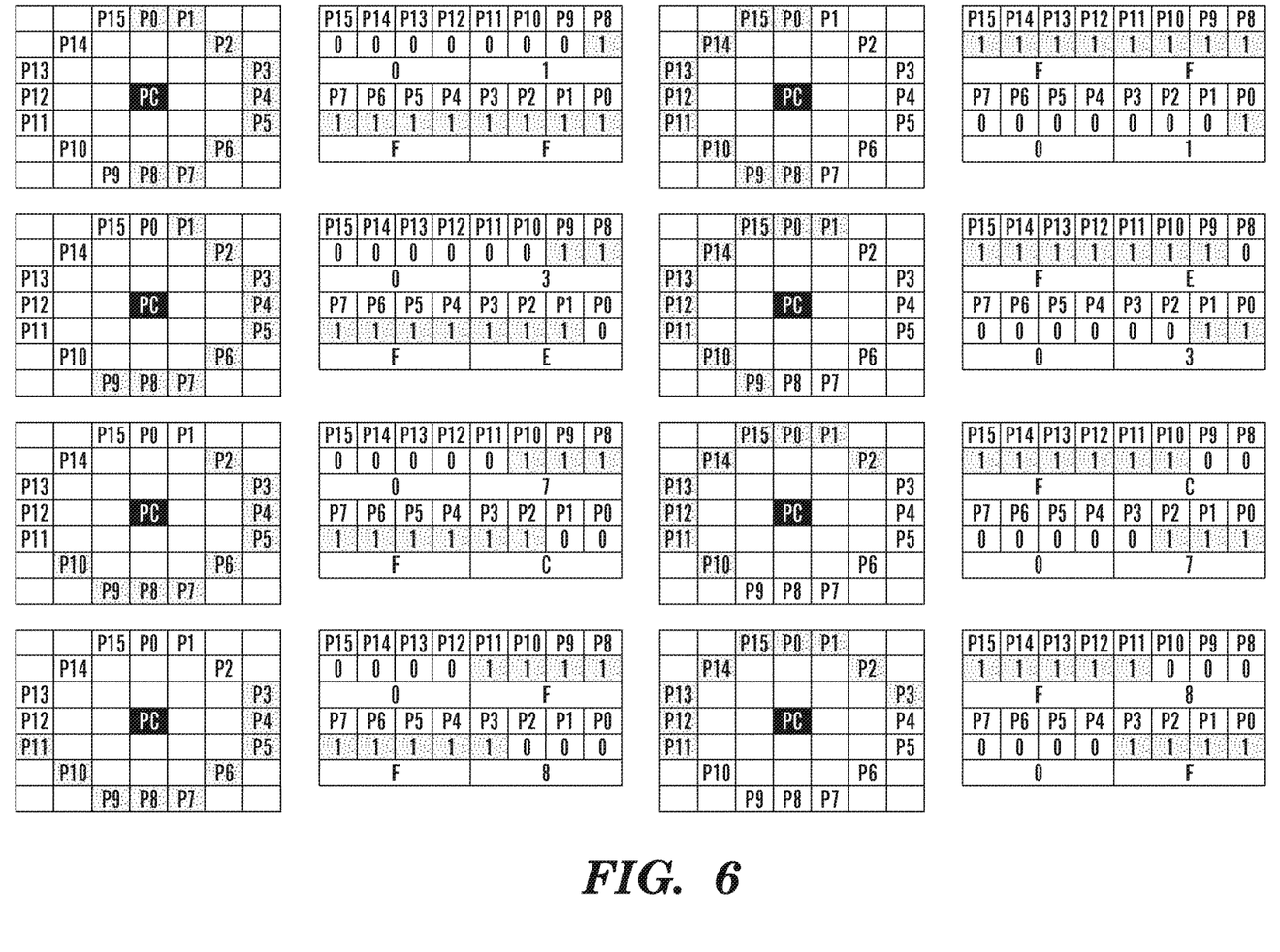
FIG. 6 shows the 16 possible comparison templates for the exemplary FAST algorithm using a Bresenham circle of radius 3.

Thus for example, in the case of a 16 pixel Bresenham circle there are only 16 possible ways in which 9 pixels can be arranged contiguously as shown in FIG. 6. Thus if a vector is created Vseg combining entries with each of these possible 16 ways, a comparison may readily be done with the repeated pattern in vector V_r to provide a vector V_match (identifying whether any match is found). If all of the entries in V_match are zero then the candidate pixel is not a corner. If the overall result of V_match is non-zero then the candidate pixel is a corner.

Depending on the nature of the vector processor employed, it may not be possible to use a single vector. Thus, taking the example of a radix-128 (VLIW), instead of all the possible combinations being contained in a single Vseg, they are split into two vectors Vsega. and Vsegb with two vector functions required rather than one, resulting in two Vector matches V_matchA and V_matchB, where $$V\_matchA=Vres\ \&\ V\_sega$$

If V_matchA is non-zero (i.e. if any element matches) then the candidate pixel is a corner.

$$V\_matchB=Vres\ \&\ V\_segb$$

If V_matchB is non-zero (i.e. if any element matches) then the candidate pixel is a corner.

An optional final step may be employed to suppress non-maximum corners in a close knit group, i.e. non-maximal suppression. In this optional test, each corner is given a score based on the absolute sum of the differences between each pixel Pi in the arc and the centre pixel. This score may be used to distinguish between candidate pixels in a close knit group. The advantage of the earlier steps is that they may be used to simplify this final step.

In particular, a mask vector V_mask may be created from the scalar S_r, by creating a vector where elements are all ones if the corresponding point exceeded the threshold or all zeros otherwise. Thus, rather than indirectly identify and sum the relevant scores for each pixel in the surrounding pixels of the Bresenham circle to provide a corner score, the corner score may be performed using a single vector function, i.e.

$$\text{Score}=\text{SUM}\{|Vpi-Vpc|\&V\_mask\}$$

The resulting performance of the present method is significant compared to alternative methods in the art. Although, the degree of improvement will vary depending on the nature of the picture, the value of thresholds and the value of N (9, 10, 11 or 12), analysis has determined that a performance may be obtained of approximately 1.6 cycles per pixel, i.e. it takes 1.6 microprocessor cycles on average to determine whether a pixel is a corner or not.

An equivalent process in the prior art is believed to take closer to 50 cycles per pixel. Accordingly, it will be appreciated that the improvement in performance is quite significant.

Figure 7:
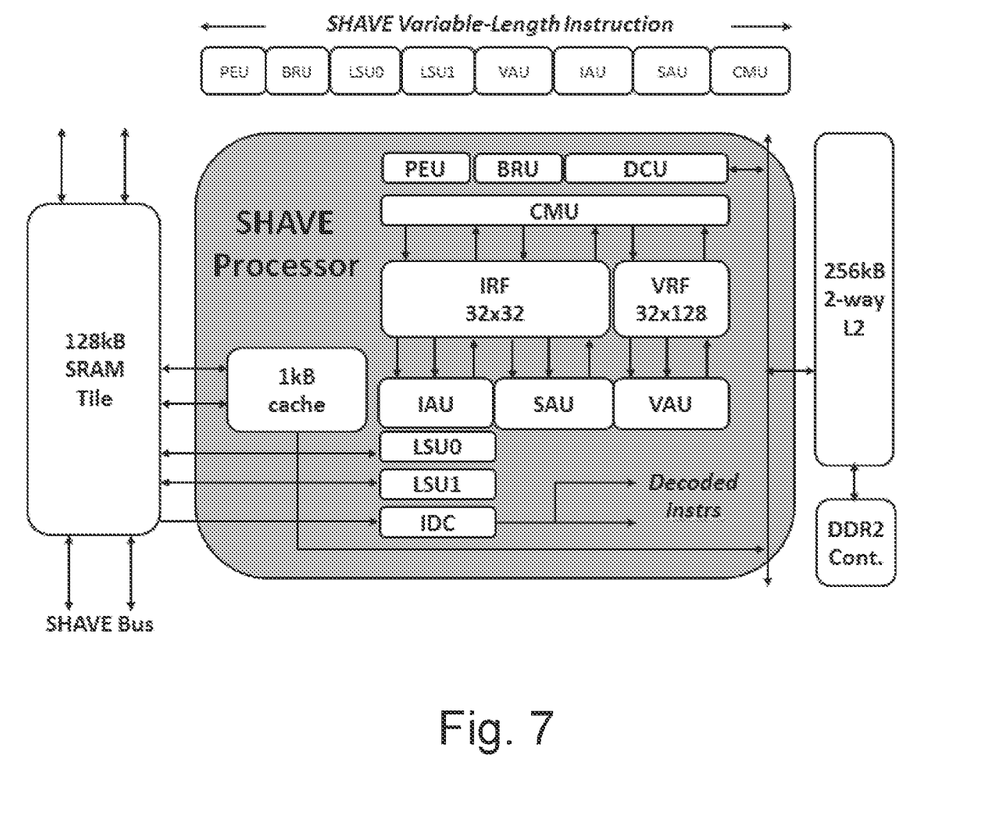
FIG. 7 is an exemplary vector processor with a configuration of functional units tailored to image and video processing workloads such as the FAST algorithm.

The enabling vector processor hardware for the efficient implementation of this algorithm is shown in FIG. 7. As can be seen, the processor includes multiple register files and execution units, optimized for operating in parallel on a mixture of 128-bit vectors and 32-bit integers and scalars.

Figure 8:
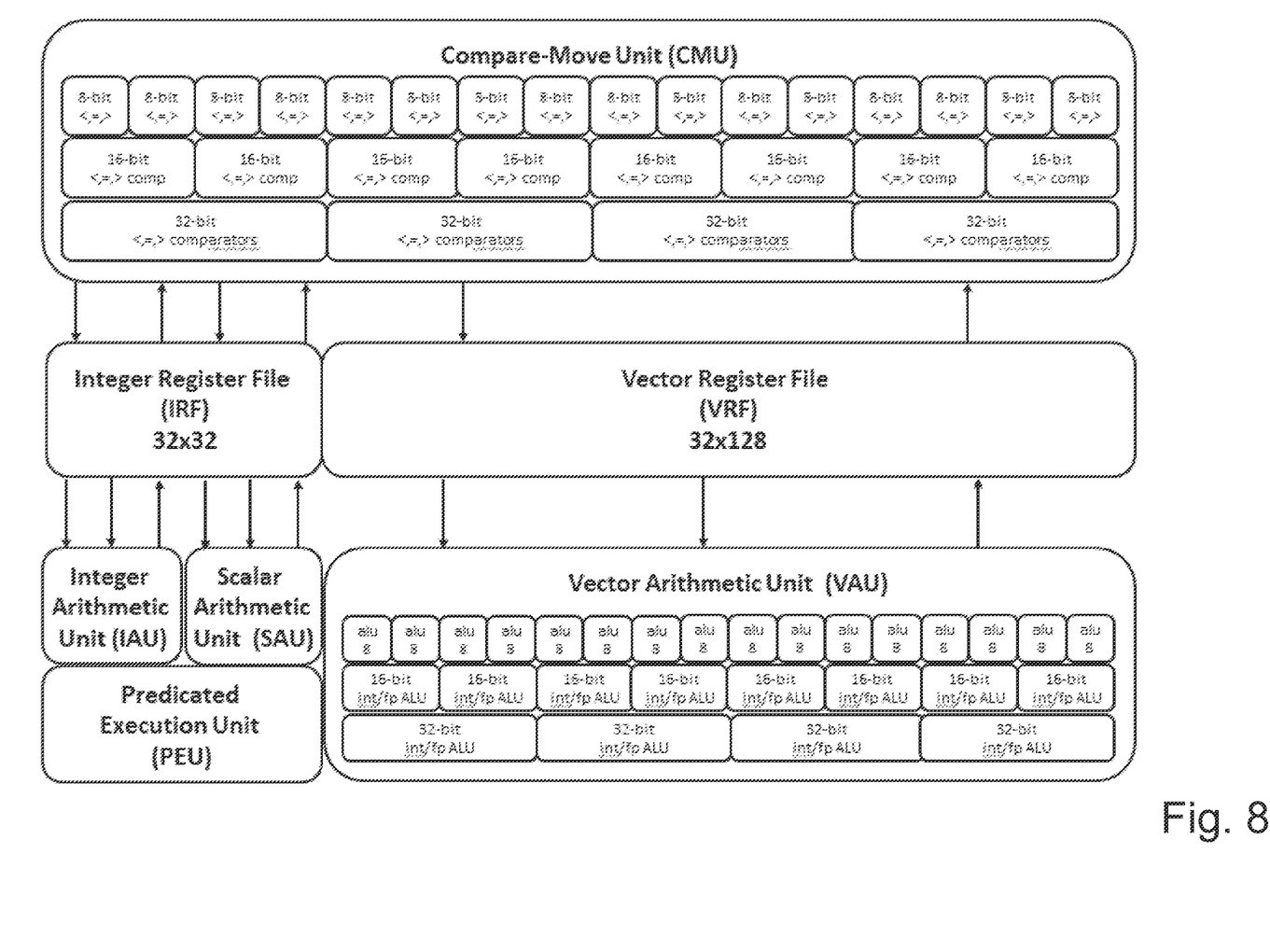
FIG. 8 is an exemplary vector processor datapath with opcodes and arithmetic units tailored to image and video processing workloads such as the FAST algorithm.

The datapath of the vector processor is shown in FIG. 8 and includes multiple functional units. The key functional units from the point of view of execution of the FAST algorithm are the Predicated Execution Unit (PEU), Vector Arithmetic Unit (VAU), Scalar Arithmetic Unit (SAU), Integer Arithmetic Unit (IAU) and Compare Move Unit (CMU). The VAU supports 8, 16, 32 and 64-bit operations on both signed and unsigned integers as well as floating-point numbers. The IAU supports 8, 16, 32 and 64-bit operations on both signed and unsigned integers, and the SAU supports operations on 16 and 32-bit floating-point numbers. The CMU allows vector comparisons to be carried out on 128-bit vectors of 8, 16, 32 or 64-bit signed or unsigned integers or 16, 32 or 64-bit floating-point numbers in parallel with the VAU, IAU, SALT and other datapath elements. Additionally, in order to minimise bandwidth and power, the CMU performs 3 comparisons (greater-than, less-than and equal-to) in parallel on each vector element, whether 8, 16, 32 or 64-bit, so the CMU performs a total of 48 comparisons on two 128-bit vectors of 8-bit numbers in a single clock-cycle. This number of comparisons would typically take many more clock-cycles on a more typical processor. Finally, the results of the comparisons are a, series of bit-level predicates which can be logically combined in the PEU to test whether a particular relationship exists between the 2 CMU input vectors, again in a single cycle.

This parallel comparison capability combined with programmable predication logic within a vector-processor is applicable to a large variety of algorithms which require a high ratio of comparison to computation such as 3D graphics and game-physics, and more generally collision-detection.

In classical operation the FAST algorithm does not yield a corner direction, or any approximation thereof. In this particular implementation an estimate of the corner direction may be obtained in two different ways, using the intermediate information available.

The first such method produces a measure of corner detection by recording which of the patterns (for example, which of the patterns shown in FIG. 6) was successfully matched. In the case where more than one pattern is matched an average may be taken.

The second such method is useful where a more accurate estimate is required at additional computational expense. The estimate is calculated as the aggregate position of the pixels that contribute to the corner, weighted by the difference between the centre pixel and the individual contributing pixels. Specifically:

$$d(x)=K^*abs(Pi-Pc)/NP$$

$$Cdir=\{d(1)+d(2)+\ldots d(NP)\}^*\pi/8$$

where Pi is pixel value, Pc centre pixel value, K is the pixel index in the circle to (0to 15) and NP is the number of pixels that contribute to the corner (as least 9 for N=9). The resulting corner direction Cdir is in radians.

Figure 4:
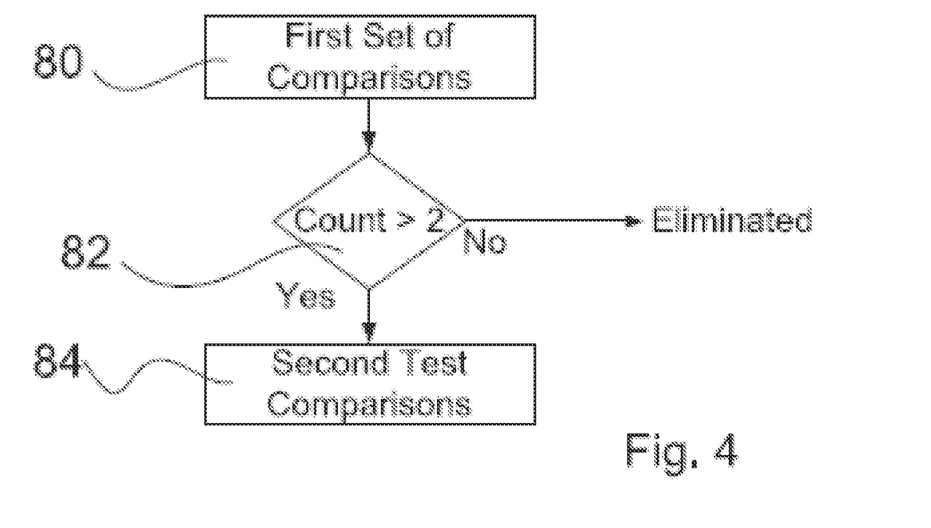
FIG. 4 is a two stage corner detection method of the present application.
Figure 5:
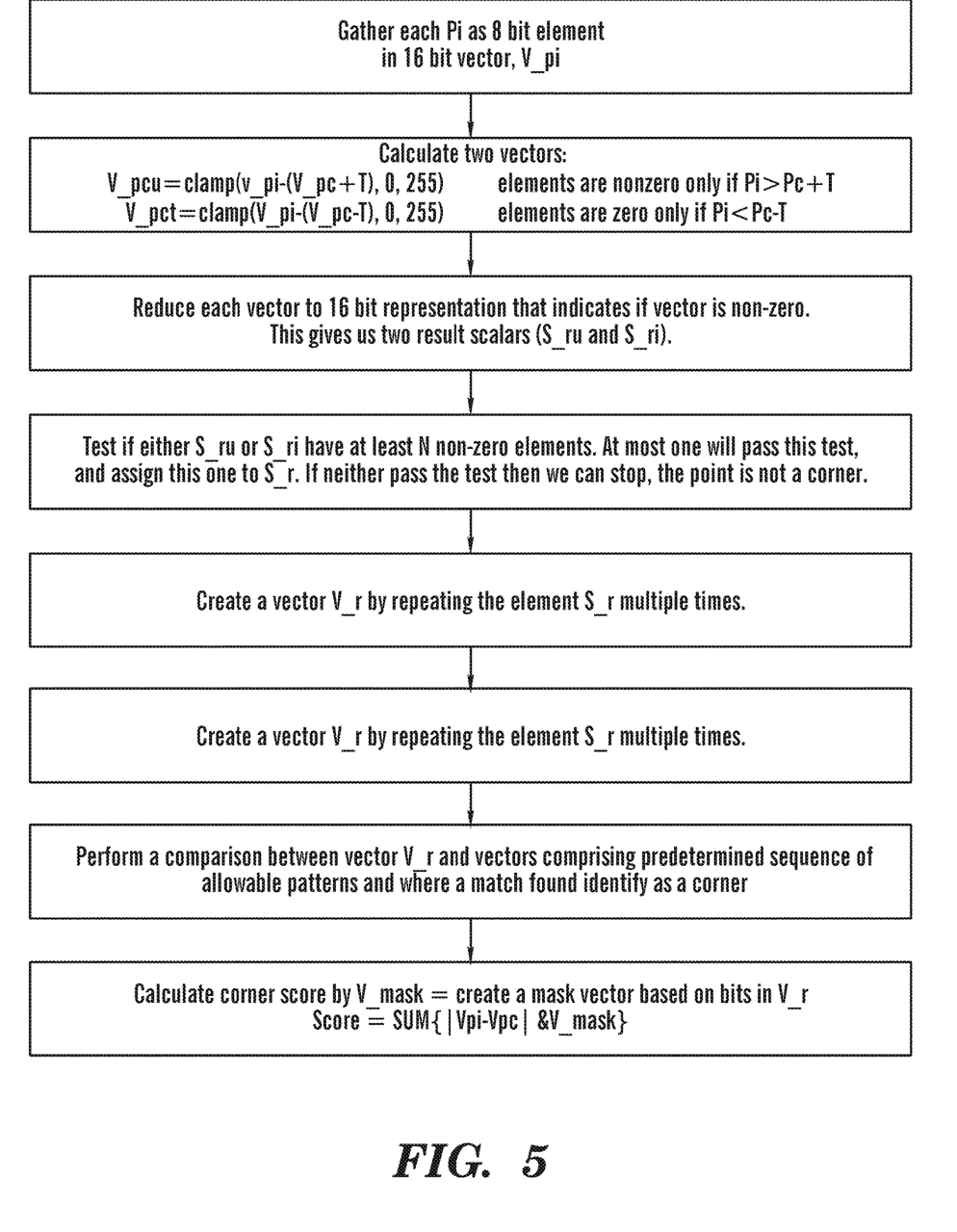
FIG. 5 is an exemplary method which may be employed as a second stage of the two stage corner detection method of FIG. 4 or in isolation.

The processing time for carrying out the above corner detection may be further reduced by the use of an additional process that filters out candidate pixels without having to undergo the full algorithm. The present application provides a two stage algorithm as shown in FIG. 4 that provides for significantly improved computational speeds particularly when used on vector-processors of the type commonly employed in embedded applications.

The first stage 80 of the algorithm is a corner exclusion process which acts to perform a check to determine whether the candidate pixel is excluded as being a corner. Those candidate pixels not excluded are identified as probable corners. The second stage 84, the full corner-matching process as described above, is performed only on the probable pixels not excluded by the first stage.

This first stage can employ one of a number of methods to achieve the goal of excluding a candidate as a corner pixel as fast as possible. The aggregate algorithm performance will be such that:

$$NCtot=1^*NCexclude+(1-p)^*NCfull$$

where:
NCtot is the aggregate cycle count
NCexclude is the exclusion cycle count
NCfull is the full algorithm cycle count
p is the percentage of pixels that may be excluded by the exclusion test Different exclusion algorithms are possible, and the choice depends on the processor architecture, and in some cases also on path decisions recorded from processing a reference image set.

Figure 9:
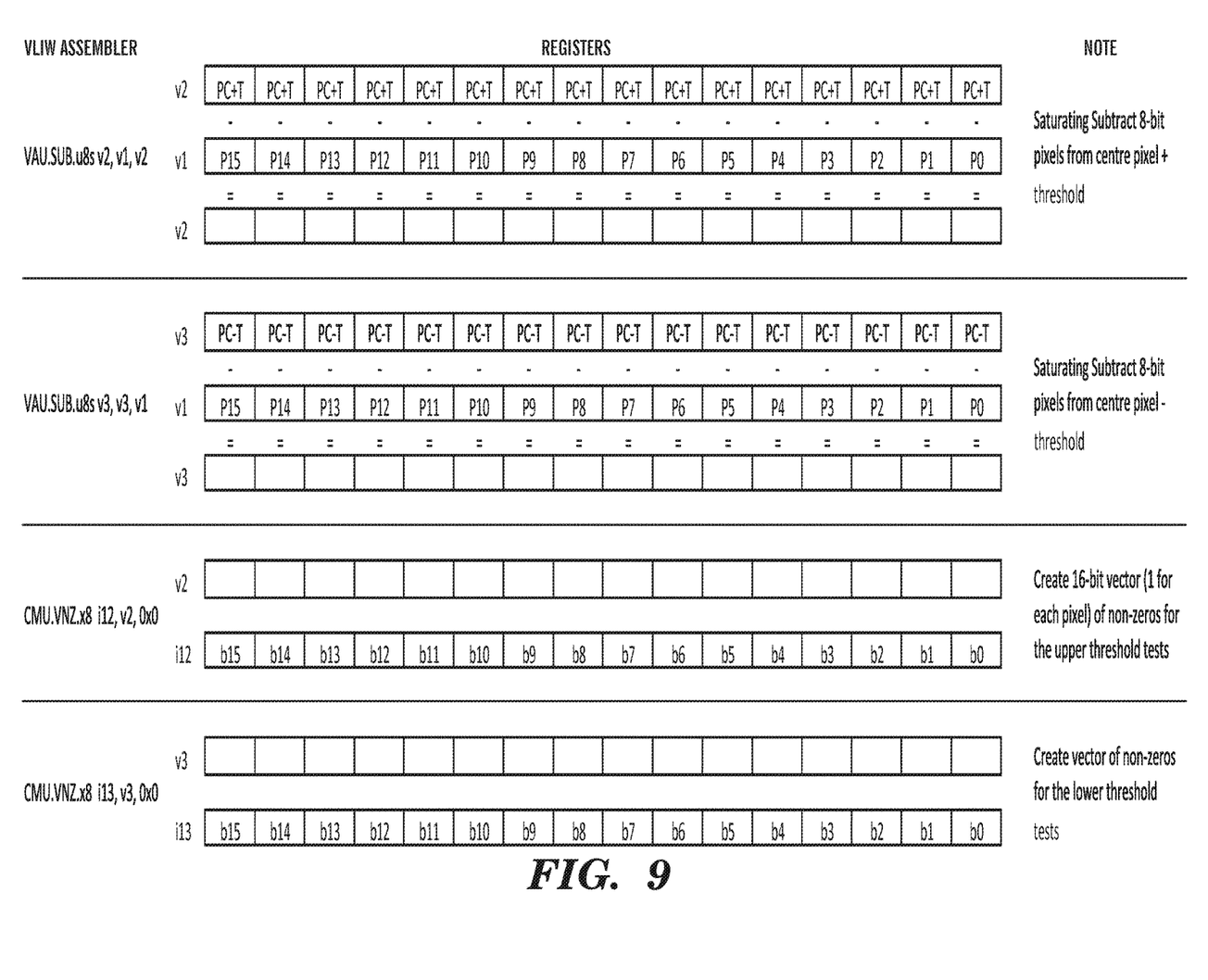
FIG. 9 is VLIW code implementing the optimised implementation for the exemplary vector processor.

Rosten 2006, cited in the Background section above, describes one such algorithm. Here a second algorithm is described which, although yielding a less efficient exclusion percentage, may be more efficiently implemented on particular architectures.—specifically, p is slightly lower, but NCexclude is also lower, which yields an aggregate improvement on particular vector processing architectures such as the exemplary architecture described above. By way of example, line 8 of the VLIW code (VAU.AND v2, v13, v14) in FIG. 9 implements in a single cycle what would require at least 8*9 comparisons and 8*8 logical AND or IF-THEN-ELSE operations on a conventional scalar processor. The exact improvement will depend on the scalar or alternate vector processor architecture being compared to the proposed work. One of ordinary skill will recognize that variants of the architecture described herein may allow for a greater advantage over traditional general-purpose processing; for example, variations able to accommodate larger vector-length for parallel processing may further improve the processing speed of the present disclosure over that of the prior art.

The first stage performs a comparison between the candidate pixel and a set of non-contiguous pixels around the candidate pixel to determine whether their difference exceeds a first threshold. The results of the comparisons are then counted 82 where if the count does not exceed a second threshold the candidate pixel is eliminated as a corner. In contrast if the count exceeds the second threshold, the candidate pixel is considered a probable corner pixel method progresses to the second stage to determine whether the candidate pixel is a corner.

Figure 2:
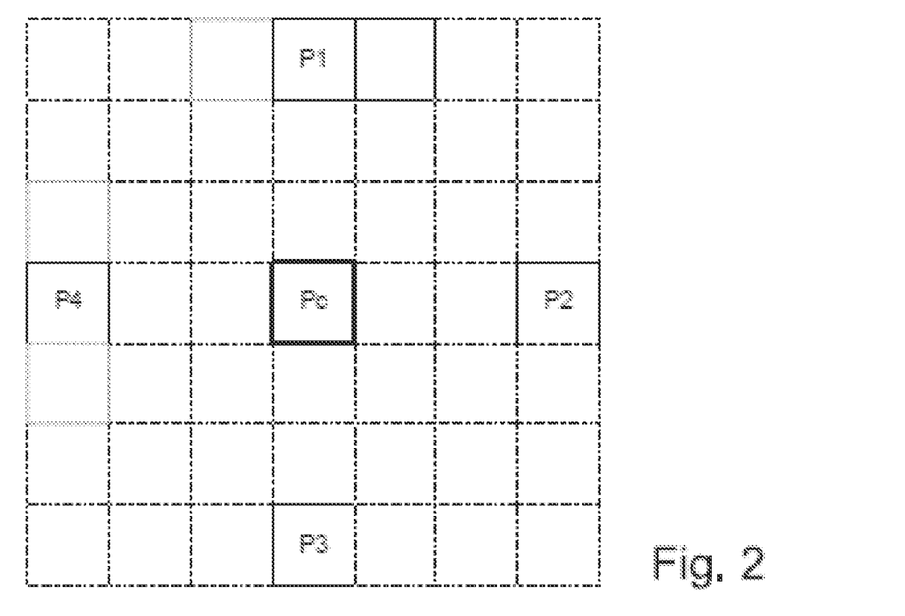
FIG. 2 is an exemplary pattern of pixels employable by detection methods of the present invention.

A first exemplary pattern for a set of non-contiguous pixels is shown in FIG. 2. The pattern comprises a diamond shape of 4 pixels (P1, P2, P3, P4) about the candidate pixel Pc. Alternatively stated, the set of non-contiguous pixels comprise pixels arranged along two orthogonal axes which intersect at the candidate pixel. Thus the first and third pixels (P1, P3) are arranged along a vertical axis and the second and fourth pixels (P2, P4) are arranged about a horizontal axis. The candidate pixel Pc is positioned at the intersection of the two axes. In the exemplary arrangement, there are two pixels in between each of the pixels of the set of non-contiguous pixels and the candidate pixel. Any pairs of opposing points on the circle may be employed, although choosing points with maximum distance tends to provide best results. If the four non-contiguous pixels are considered in the Bresenham circle of pixels as shown in FIG. 1, it will be appreciated that there are three pixels separating each pair of the four pixels around the circumference of the circle. Thus, for example, considering the Bresenham circle of FIG. 1, the 4 pixels of the set of non-contiguous pixels might be considered as P0, P4, P8 and P12. Thus P0 and P4 would be separated by the three pixels P1, P2, P3, with P4 and P8 separated by the three pixels of P5, P6 and P7, with P8 and P12 separated by the three pixels of P9, P10 and P11 and P12 and P0 separated by the three pixels of P13, P14 and P15.

Figure 3:
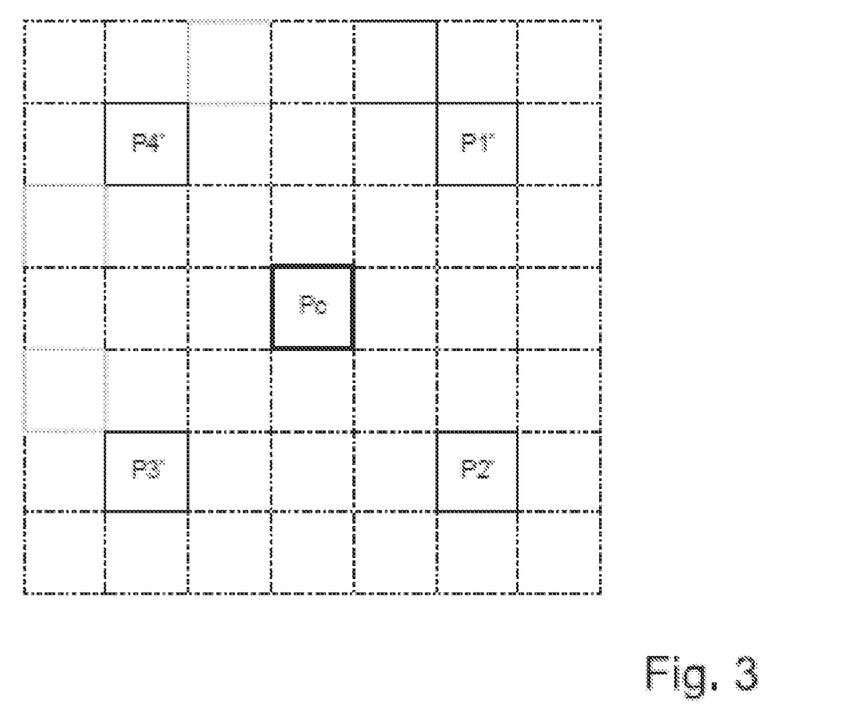
FIG. 3 is a further exemplary pattern of pixels employable by detection methods of the present invention.

The method is not limited to the non-contiguous pattern of FIG. 2; other patterns are possible. Other sets of separated pixels such as a Bresenham circle might be employed. For example, a further exemplary pattern is shown in FIG. 3 for a set of non-contiguous pixels. The pattern comprises a square shape of 4 pixels (P1, P2, P3, P4) about the candidate pixel Pc. Alternatively stated, the set of non-contiguous pixels comprise pixels arranged along two orthogonal axes which intersect at the candidate pixel. Thus the first and third pixels (P1, P3) are arranged along a first diagonal axis and the second and fourth pixels (P2, P4) are arranged about a second diagonal axis. The candidate pixel is positioned at the intersection of the two diagonal axes. In the exemplary arrangement, there are two pixels directly between each of the pixels of the set of non-contiguous pixels and the candidate pixel. It will be appreciated that in the context of the Bresenham circle of FIG. 1, there are three pixels between each pair of the non-contiguous pixels around the circumference.

The comparison performed between a candidate pixel and each of the pixels of the set of non-contiguous pixels is suitably a comparison of the absolute difference between each of the pixels and the candidate pixel and a threshold value, for example the comparison for P1 is whether abs(P1−Pc)>T, similarly for P2 is whether abs(P2−Pc)>T, with the comparison for P3 is whether abs(P3−Pc)>T and for P4 whether abs(P4−Pc)>T, where abs( ) returns the absolute value of the expression in parentheses.

A second step in the first stage performs a count of the comparison results to determine whether the number of successful comparisons exceeds a second threshold, suitably in the case of 4 points, the second threshold is two. Thus if the number of comparisons exceeding the first threshold is greater than 2, the candidate pixel remains a corner candidate. If the number of comparisons exceeding the first threshold is less than 2, the candidate pixel is eliminated as a corner candidate. Only those candidate pixels which are retained as corner candidates are submitted to the full corner candidate detection process as described above.

It will be appreciated that while several different embodiments have been described herein, that the features of each may be advantageously combined together in a variety of forms to achieve advantage.

In the foregoing specification, the application has been described with reference to specific examples of embodiments. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present application.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Thus for example references to a controller may be taken to include situations in which the control function is provided by a plurality of discrete elements as well as situations where it is provided as a single device such as an integrated circuit or as part of such an integrated circuit.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An apparatus to detect a corner in an image, the apparatus comprising:
    a vector processor to generate a pattern vector including first elements representative of first pixels arranged in a pattern around a candidate pixel;
    a hardware compare move unit (CMU) to:
        generate a comparison vector including respective elements representative of comparisons between respective ones of the first elements and the candidate pixel; and
        when a count of bits of a scalar value representative of the comparison vector satisfies a threshold, generate a replication vector having respective bits corresponding to the scalar value; and
    a hardware vector arithmetic unit (VAU) to execute a parallel AND vector operation on the replication vector and one or more corner templates to determine whether there is a match between the replication vector and the one or more corner templates.

2. The apparatus as defined in claim 1, wherein the first pixels at least partially surround the candidate pixel.

3. The apparatus as defined in claim 2, wherein the first pixels at least partially surrounding the candidate pixel form a Bresenham circle.

4. The apparatus as defined in claim 1, wherein the hardware CMU is to generate the scalar value representative of the comparison vector.

5. The apparatus as defined in claim 1, wherein the scalar value includes at least one of a 16-bit value or a hexadecimal value.

6. The apparatus as defined in claim 1, wherein respective elements of the replication vector are the scalar value.

7. The apparatus as defined in claim 6, wherein the hardware VAU is to compare the respective elements of the replication vector to respective scalar values of the one or more corner templates.

8. The apparatus as defined in claim 1, wherein the threshold is a first threshold, and the hardware CMU is to generate the comparison vector by identifying pixels that satisfy a second threshold.

9. The apparatus as defined in claim 8, wherein the hardware CMU is to clamp the second threshold between a value of 0 and 255.

10. A computer-readable storage device comprising instructions that, when executed, cause one or more processors to, at least:
generate a pattern vector including first elements representative of first pixels arranged in a pattern around a candidate pixel;
generate a comparison vector including respective elements representative of comparisons between respective ones of the first elements and the candidate pixel;
when a count of bits of a scalar value representative of the comparison vector satisfies a threshold, generate a replication vector having respective bits corresponding to the scalar value; and
execute one or more parallel AND vector operations on the replication vector and one or more corner templates to determine whether there is a match between the replication vector and the one or more corner templates.

11. The computer-readable storage device as defined in claim 10, wherein the instructions, when executed, further cause the one or more processors to identify that the first pixels at least partially surround the candidate pixel.

12. The computer-readable storage device as defined in claim 11, wherein the instructions, when executed, further cause the one or more processors to identify that the first pixels at least partially surrounding the candidate pixel form a Bresenham circle.

13. The computer-readable storage device as defined in claim 10, wherein the instructions, when executed, further cause the one or more processors to generate the scalar value representative of the comparison vector.

14. The computer-readable storage device as defined in claim 10, wherein the instructions, when executed, further cause the one or more processors to represent the scalar value as at least one of a 16-bit value or a hexadecimal value.

15. The computer-readable storage device as defined in claim 10, wherein the instructions, when executed, further cause the one or more processors to replicate the scalar value as respective elements of the replication vector.

16. The computer-readable storage device as defined in claim 15, wherein the instructions, when executed, further cause the one or more processors to compare the respective elements of the replication vector to respective scalar values of the one or more corner templates.

17. The computer-readable storage device as defined in claim 10, wherein the instructions, when executed, further cause the one or more processors to generate the comparison vector by identifying pixels that satisfy a second threshold.

18. The computer-readable storage device as defined in claim 17, wherein the instructions, when executed, further cause the one or more processors to clamp the second threshold between a value of 0 and 255.

19. A computer-implemented method to detect a corner in an image, the method comprising:
generating, by executing an instruction with at least one processor, a comparison vector including respective elements representative of comparisons between respective ones of first elements of a pattern vector and a candidate pixel;
when a count of bits of a scalar value representative of the comparison vector satisfies a threshold, generating, by executing an instruction with the at least one processor, a replication vector having respective bits corresponding to the scalar value; and
executing a parallel AND vector operation on the replication vector and one or more corner templates with the at least one processor to determine whether there is a match between the replication vector and the one or more corner templates.

20. The computer-implemented method as defined in claim 19, wherein the first elements of the pattern vector are representative of first pixels arranged in a pattern that at least partially surround the candidate pixel.

* * * * *